United States Patent

[11] 3,544,777

[72] Inventor Ted Winkler
Inglewood, California

[21] Appl. No. 680,663
[22] Filed Nov. 6, 1967
[45] Patented Dec. 1, 1970
[73] Assignee TRW Inc.
Redondo Beach, California
a corporation of Ohio

[54] TWO MEMORY SELF-CORRECTING SYSTEM
12 Claims, 6 Drawing Figs.

[52] U.S. Cl. .......... 235/153, 340/174
[51] Int. Cl. .......... G06f 11/00; G11c 29/00
[50] Field of Search .......... 235/153; 340/146.1, 146.2, 172.5, 174

[56] References Cited

UNITED STATES PATENTS

| | | | |
|---|---|---|---|
| 2,932,005 | 4/1960 | Brightman | 340/146.1X |
| 2,945,915 | 7/1960 | Strip | 340/146.1X |
| 3,161,732 | 12/1964 | Martin et al. | 340/146.1X |
| 3,239,810 | 3/1966 | Jacoby | 340/146.2 |
| 3,252,149 | 5/1966 | Weida et al. | 340/146.1X |
| 3,302,182 | 1/1967 | Lynch et al. | 340/146.1X |
| 3,311,890 | 3/1967 | Waaben | 340/146.2X |
| 3,409,877 | 11/1968 | Alterman et al. | 340/146.1X |

OTHER REFERENCES

Downing, et al.: No. 1 ESS Maintenance Plan, The Bell System Technical Journal, September 1964, pp. 1961–2019.

*Primary Examiner*—Malcolm A. Morrison
*Assistant Examiner*—Charles E. Atkinson
*Attorneys*—Daniel T. Anderson, Harry I. Jacobs and Gerald Singer

ABSTRACT: A memory system including redundancy and failure analysis means. The system utilizes two or more memories, whose outputs are supplied to a common comparator. For so long as the comparator indicates that the memory outputs are identical, the system will continue to operate normally with the common memory output information being supplied to a central processor. When the comparator indicates that the memory outputs differ, however, operation is switched to a failure analysis mode in which a plurality of prewired test data words are written into the memories. Subsequently, the test data words are sequentially read from each memory and compared with data stored in a fixed store. The read test data words which differ from the corresponding words in the fixed store identify the failed memory circuits. The system can then continue to operate using the memory which has not failed. Additionally, a repair means can be activated to replace the failed circuit after which the system can be returned to two memory operation.

*INVENTOR.*
TED WINKLER

*BY* Lindenberg + Freilich

ATTORNEYS

*INVENTOR.*
TED WINKLER
*BY* Lindenberg + Freilich
ATTORNEYS

INVENTOR.

TED WINKLER

BY

ATTORNEYS

INVENTOR.
TED WINKLER
BY Lindenberg & Freilich
ATTORNEYS

TWO MEMORY SELF-CORRECTING SYSTEM

BACKGROUND OF THE INVENTION

1. Field of the Invention

This invention relates generally to digital memory systems, and, more particularly, to such a system which is more reliable than heretofore known systems and which incorporates redundancy means and failure analysis means for ascertaining and identifying memory circuit failures.

2. Description of the Prior Art

Of the many types of digital memory systems known in the art, coincidence select magnetic core memory systems are by far the most widely employed. These systems are usually comprised of a plurality of core planes, each plane corresponding to a different bit position in a word. Core selection involves selectively switching correspondingly positioned cores in each plane without effecting any of the other cores. The cores in each plane are arranged in a rectangular matrix with a particular core being selected by driving suitable currents through the row and column conductors associated with that core. A current is driven through a row (X) or column (Y) conductor by enabling a driver and a switch coupled to opposite ends of the conductor. If a core plane is to contain MN cores, then there will be M row (X) conductors and N column (Y) conductors. Inasmuch as each conductor terminates in a driver and a switch, there will also be M X drivers and M X switches for row conductor selection and N Y drivers and N Y switches for column conductor selection. Memory failures will occur if any of the drivers or switches fail.

OBJECTS AND SUMMARY OF THE INVENTION

It is an initial object of the present invention to provide a digital memory system which is more reliable than heretofore known systems, in that it can continue to operate despite the occurrence of a circuit failure.

It is an additional object of the present invention to provide a digital memory system which includes means responsive to a failure for identifying the cause of the failure.

Briefly, in accordance with the preferred embodiment of the invention, a memory system is provided including two or more independent memories which are essentially operated in parallel so that they normally store identical information. In order to access information, both memories are read, and their outputs compared. For so long as the outputs are identical, no failure condition is indicated, and operation continues in a normal mode. Failure is indicated when the outputs do not agree and thereafter an analysis or diagnostic operational mode is initiated.

In this latter mode, prewired test data words are written into the two memories in a sufficient number of locations to require the utilization of all of the drivers and switches upon subsequent readout. After writing, the test data words are sequentially read, first from one of the memories and then from the other. The read test data words are compared with words stored in a fixed store. Each test data word matching the corresponding word in the fixed store indicates that the drivers and switches associated with the memory location from which the test data word was accessed, are good. On the other hand, a mismatch indicates that at least one of the group of drivers and switches associated with the accessed memory location has failed. Once the failed memory has been ascertained, system operation can be resumed utilizing the good memory. Failure analysis can then be continued by making further test word comparisons to identify the particular failed circuit in the failed group.

One significant aspect of the preferred embodiment of the invention involves the utilization of magnetic core circuits for counting, address signal generation, and comparison of read test data words with fixed stored words.

The novel features of the invention are set forth with particularity in the appended claims. The invention will best be understood from the following description when read in conjunction with the accompanying drawings.

Figure 1:
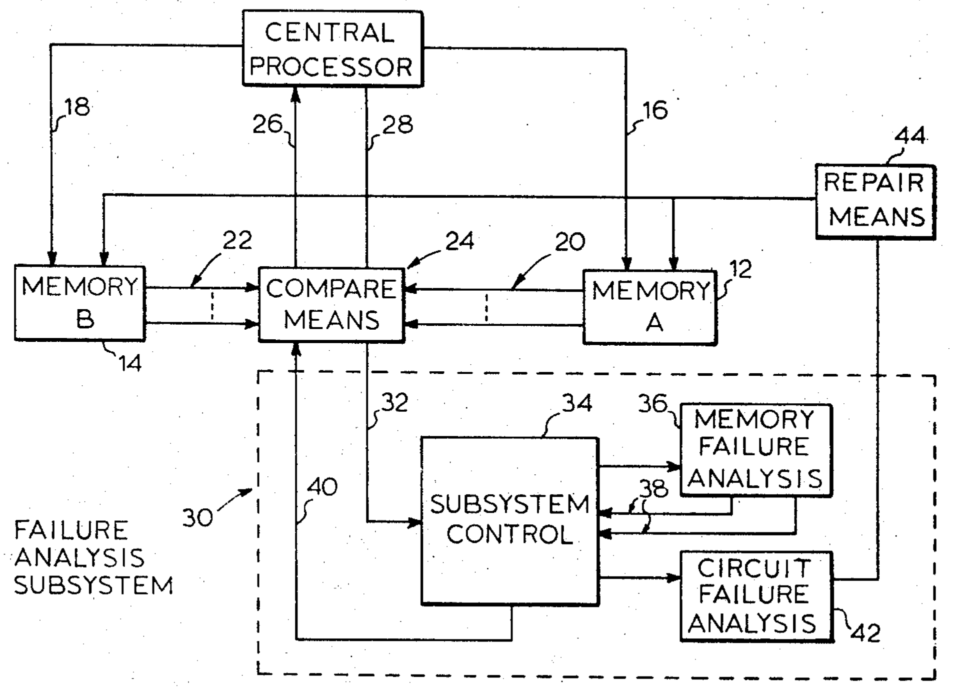
FIG. 1 is a block diagram of a memory system constructed in accordance with the present invention.

In order to achieve greater reliability than is provided by conventional data processing systems, the system of the present invention, as disclosed in FIG. 1, utilizes two or more memories rather than a single memory. More particularly, the central processor 10 is connected to both a memory A 12 and a memory B 14. In accordance with the invention, the memories 12 and 14 are preferably identical and normally operate in parallel and store identical information. Whenever the central processor 10 needs to access stored information, both memories 12 and 14 are simultaneously addressed via lines 16 and 18. The memories 12 and 14 provide output information respectively on output lines 20 and 22 to a compare means 24. If the information read from memory 14 matches the information read from memory 12, then that information is supplied to the central processor via data lines 26. However, if a circuit in one of the memories fails, then the information read from the two memories will not match, and this occurrence will be communicated to the central processor via control line 28. In addition, this mismatch occurrence will be communicated to a failure analysis subsystem 30 via control line 32. As will be explained in greater detail hereinafter, the failure analysis subsystem 30 operates initially to identify the failed memory, and can subsequently operate to identify the failed circuit. After the failed memory is identified, the comparator means 24 can be disabled and the system can return to essentially normal operation, using the memory which has not failed. As a consequence, it will be appreciated that the system is more reliable than conventional systems, because, in the event of a failure in one memory system, the overall system can continue to operate after only a short delay required to ascertain which memory system failed. By subsequently determining the specific circuit which failed, the duration of any system "down time" can be minimized inasmuch as any repair job is reduced to mere replacement (either physical or by the use of controllable switches). After the failed memory is repaired, it can be reinserted into the system which will thereafter again operate with two parallel memories.

Briefly, the subsystem 30 is comprised of a subsystem control means 34 which is responsive to a signal provided thereto by the compare means 24 in line 32. The control means 34 initially operates a memory failure analysis means 36 which provides information back to the control means 34 on lines 38 identifying the failed memory. Four different memory failure conditions can exist; e.g., condition $\overline{A}B$ meaning that memory A has failed and memory B is good, condition $A\overline{B}$ meaning that memory B has failed and memory A is good, condition $\overline{AB}$ meaning that both memories have failed, and condition AB, meaning that both memories are good. In the event of conditions $\overline{A}B$ or $A\overline{B}$ the control means 34 controls the compare means 24 via line 40 to cause only the output of the good memory to be coupled to the central processor. The cause of failure in the failed memory can subsequently be determined, and the memory can be repaired. If condition $\overline{AB}$ is indicated, immediate circuit failure analysis and repair is required. If condition AB is indicated, it is probable that transient noise caused the initial failure indication and operation should return to the normal two memory mode.

After the failed memory has been ascertained, the control means 34 can activate a circuit failure analysis means 42 which determines the particular circuit which failed. A repair means 44 can then be operated to repair or replace the failed circuit. The repair means 44 represented in FIG. 1 is intended to represent various possible configurations and may merely comprise some means which indicates to a maintenance man which circuit failed. Alternatively, the repair means could comprise a switching means which functions to substitute spare circuits for failed circuits.

Briefly, in accordance with the invention, a failed memory is ascertained by causing a predetermined test data pattern to be written into certain selected locations of the memories. These locations are selected so that, upon subsequent readout, all of the memory drivers and switches have to be utilized. After writing the test data into the memories, the locations storing the test data are sequentially read, and the information thus obtained is compared with information stored in a fixed store. If all of the test data words read from a memory match the corresponding words in the fixed store, then that memory is good. If any test data word mismatches the corresponding word in the fixed store, then that memory has failed. A test data word which mismatches the corresponding information in the fixed store indicates a failure of one of the circuits (i.e., an X driver, a Y driver, an X switch, a Y switch) associated with the location from which the test data was read. Test data is stored in a sufficient number of memory locations to enable the particular failed circuit to be identified, as will be explained in greater detail hereinafter.

Figure 2:
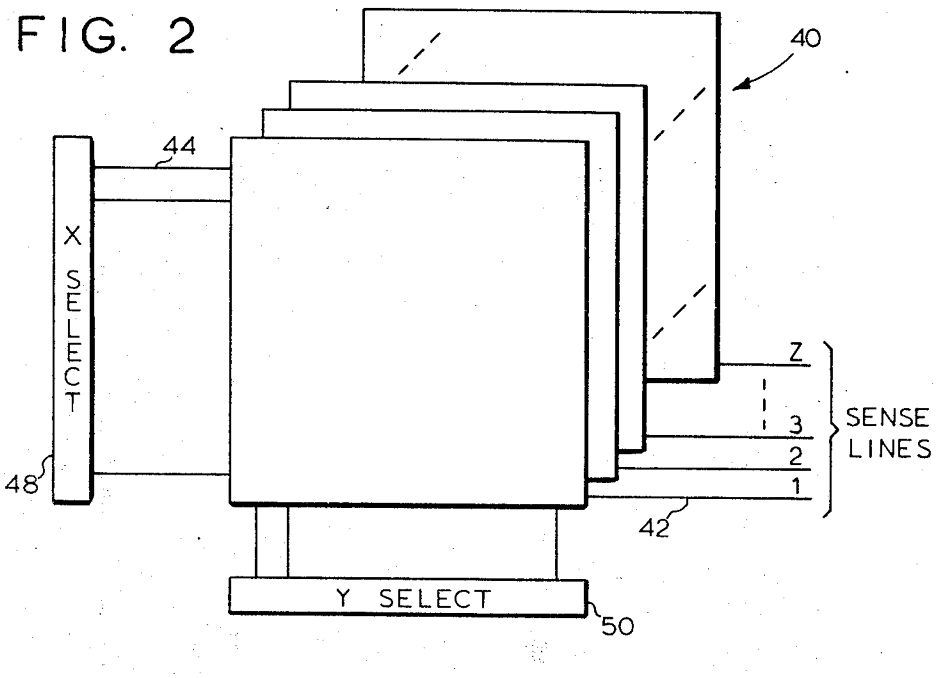
FIG. 2 is a block diagram of a typical multiplane coincident select memory.
Figure 3:
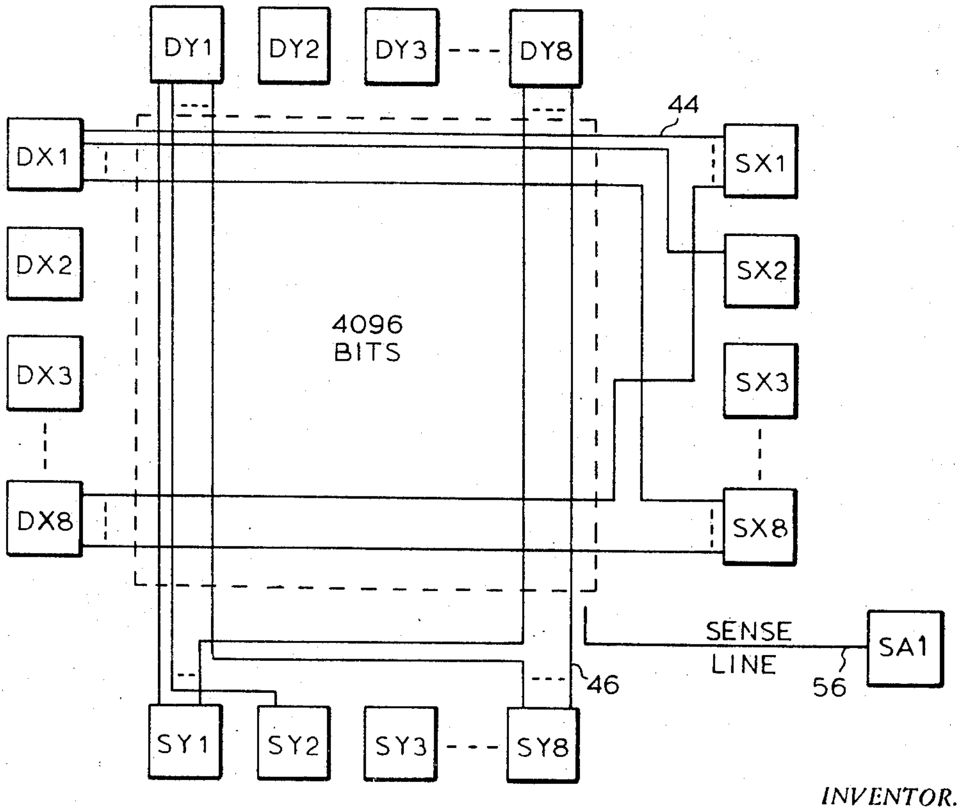
FIG. 3 is a block diagram of a typical coincident select memory plane.
Figure 4:
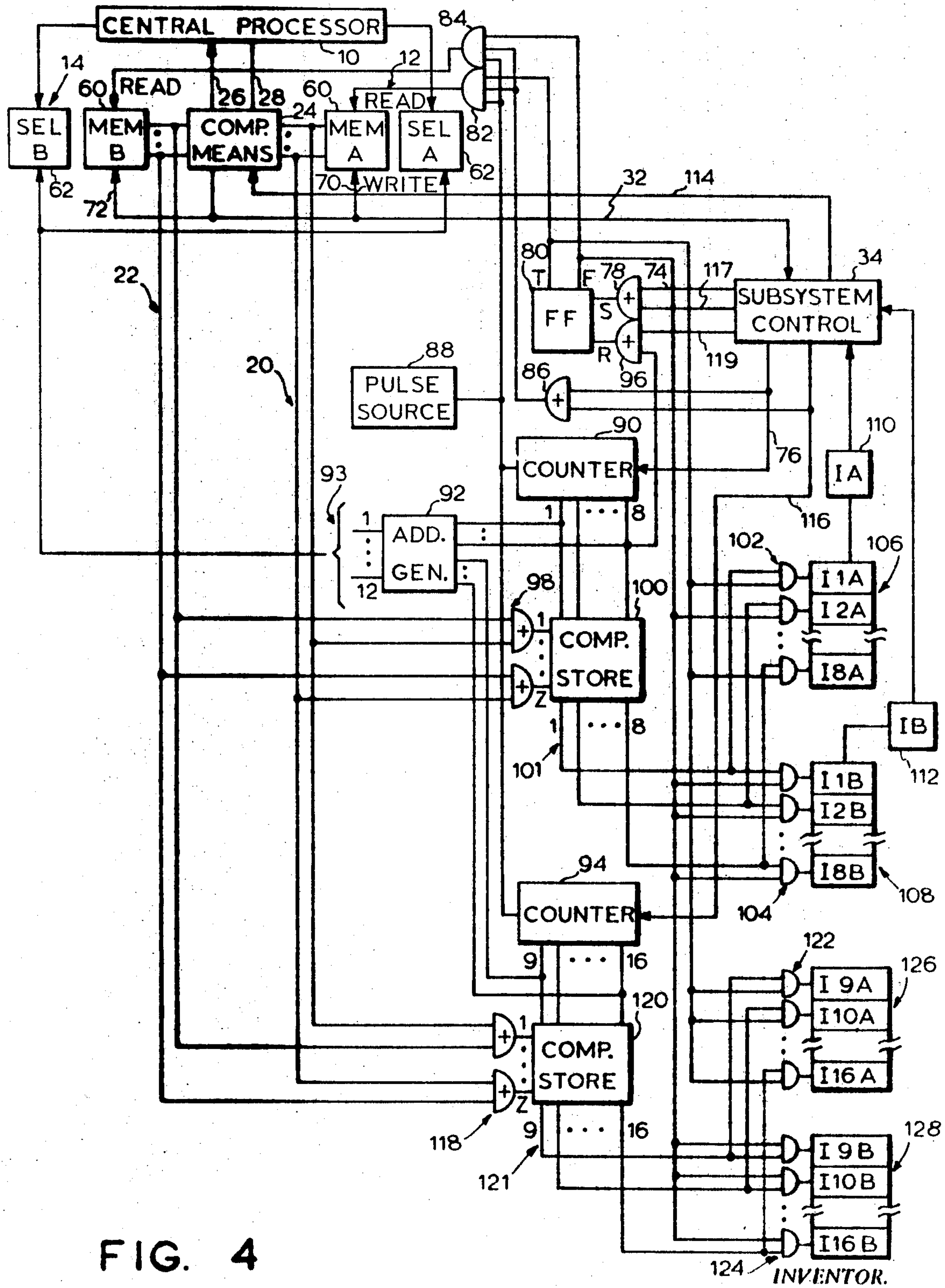
FIG. 4 is a block diagram of a preferred embodiment of the invention.

Before proceeding to a detailed explanation of an embodiment of the invention as illustrated in FIG. 4, attention is called to FIGS. 2 and 3 which respectively illustrate different aspects of substantially conventional coincident select memories, as, for example, of the magnetic core type. Such memories are usually comprised of a plurality of memory planes 40 equal in number to the desired word length. More particularly, each plane normally corresponds to a different bit position in data word stores in the memory. FIG. 2 illustrates planes 1, 2, 3...z. Each plane 40 is usually comprised of a rectangular matrix of memory elements. Thus, if the memory is to store MN words, each plane would be comprised of MN memory elements. The elements are normally arranged in M rows and N columns. A different X or row conductor 44 will be coupled to the elements of each row, and a different Y or column conductor 46 will be coupled to the elements of each column. FIG. 2 illustrates the row conductors 44 being coupled to the memory planes from an X select means 48. The column conductors 46 are coupled to the memory planes from a Y select means 50. The select means 48 and 50 operate in response to address signals applied thereto to select one X conductor 44 and one Y conductor 46, which, by current coincidence, select a correspondingly positioned element in each of the planes. Selection occurs in order to either read information from or write information into the memory.

FIG. 3 illustrates a memory plane, e.g., memory plane 1, together with portions of the X and Y selection means therefore, in greater detail. As an example, it will be assumed that each memory plane is comprised of 4,096 memory elements arranged in 64 columns and 64 rows. All of the memory elements in a single plane will be threaded by a common sense line 56, which is coupled to a sense amplifier unique to that plane. Thus, the sense line 56 in FIG. 1 is coupled to sense amplifier SA1. Each of the row and column conductors is connected between a different driver and a different switch. Thus, eight X drivers DX1 through D DX8 are provided, together with eight X switches SX1 through SX8. By interconnecting each driver to each of the different switches, 64 different row conductors 44 are provided. Any one of these 64 different row conductors can be selected by enabling the appropriate X driver and appropriate X switch coupled thereto. Similarly, any one of 64 column conductors 46 can be selected by enabling an appropriate Y driver and an appropriate Y switch. Thus, in order to select a particular memory location for either reading or writing, it is necessary to define both an X and Y driver and an X and Y switch. If a circuit failure occurs in any one of the drivers or switches of a memory, then that memory is rendered at least partially ineffective. The present invention, as broadly represented in FIG. 1, and as illustrated in more detail in FIG. 4, functions to recognize when a circuit failure occurs and to initially identify the memory containing the failed circuit. Subsequently, the particular failed circuit is identified. Although the teachings of the present invention are applicable to memories of various sizes and utilizing different types of memory elements, for the sake of simplicity herein, it will be assumed that the memory is a coincident current magnetic core memory comprised of Z planes, each plane comprising a matrix of 64 rows and 64 columns, thus defining 4,096 words.

Attention is now called to FIG. 4 of the drawings which illustrates the system of the invention, and particularly the failure analysis subsystem, in considerably greater detail. Note that FIG. 4 illustrates the memories 12 and 14 as being comprised of a memory element bank 60 and a selection means 62. In response to address signals provided to the selection means 62, information can be written into or read from the memory at the location defined by the address signals. When the system is operating in its normal mode, the address signals are provided to the selection means 62 by the central processor 10. As pointed out, the address signals define a memory location which can be read with the output of the memories 12 and 14 being applied to the compare means 24. If the information respectively provided by the memories 12 and 14 matches, then that information is provided to the central processor via conductor 26 as was mentioned in the explanation of FIG. 1. However, in the event of a mismatch, the central processor is signaled via conductor 28, and a failure analysis or diagnostic operational mode is initiated to first identify which memory failed and then to identify the source of the mismatch, i.e., the particular failed circuit. The diagnostic operational mode is initiated by the compare means 24 providing an appropriate signal via conductor 32 to the failure analysis subsystem means 34.

In response to the signal provided by the compare means on line 32, special write lines 70 and 72, respectively coupled to the elements of selected locations in memories 12 and 14, are energized. As will be better illustrated hereinafter, the write lines 70 and 72 are fixedly coupled to selected memory elements in order to write predetermined information, i.e., test data, therein. In the case of magnetic core memories, the write lines 70 and 72 will be selectively threaded through the core elements of the selected memory locations. Thus, when the compare means 24 provides a signal on line 32 to the special write lines 70 and 72, predetermined test data words will be written into the memory at the preselected locations. These preselected locations are specified by Table I hereinafter set forth and are chosen so that upon subsequent readout all of the drivers and switches shown in FIG. 3 are utilized. By so doing, the particular driver or switch whose failure initiated the diagnostic mode can be ascertained.

TABLE 1

| Test Data Word Location | Memory Circuits Associated With Each Location | | | |
|---|---|---|---|---|
| | DX | DY | SX | SY |
| 1 | 1 | 1 | 1 | 1 |
| 2 | 2 | 2 | 2 | 2 |
| 3 | 3 | 3 | 3 | 3 |
| 4 | 4 | 4 | 4 | 4 |
| 5 | 5 | 5 | 5 | 5 |
| 6 | 6 | 6 | 6 | 6 |
| 7 | 7 | 7 | 7 | 7 |
| 8 | 8 | 8 | 8 | 8 |
| 9 | 1 | 2 | 3 | 4 |
| 10 | 2 | 3 | 4 | 5 |
| 11 | 3 | 4 | 5 | 6 |
| 12 | 4 | 5 | 6 | 7 |
| 13 | 5 | 6 | 7 | 8 |
| 14 | 6 | 7 | 8 | 1 |
| 15 | 7 | 8 | 1 | 2 |
| 16 | 8 | 1 | 2 | 3 |

From Table I, it can be seen that test data word 01 is stored in a memory location requiring the proper functioning of drivers DX1 and DY1 and switches SX1 and SY1 to be properly read out. Similarly, each of the test data words 02 through 08 requires the proper operation of a set of correspondingly numbered circuits to be properly read out. In order to ascertain which memory failed after their outputs fail to match, sixteen prewired test data words are written into each memory at the locations identified by Table I. Then, the first eight test data words are read out of memory A and compared with words in a fixed store, to be described. If the first eight test data words read from memory A match the corresponding words in the fixed store, then memory A is good. If there is a mismatch of course, memory A has failed. Thereafter, memory B is analyzed to determine whether it is good.

On the basis of the memory failure analysis results, the control means 34 determines whether the system should carry on with one good memory (assuming one good memory exists) or proceed to the circuit failure analysis. The circuit failure analysis requires reading out and comparing test data words 09 through 016 from the memory being analyzed. More particularly, it should be apparent that in reading out and comparing the first eight test data words, it was not possible to determine a specific circuit that has failed. Rather, it was only possible to conclude that one circuit out of a set of four circuits had failed. For example, assuming that test data word 04 mismatched the corresponding word in a fixed store, then it could be concluded that one of the circuits of the set comprised of drivers DX4 and DY4 and switches SX4 and SY4 had failed. Subsequent readout and comparison of test data words 09 through 016 isolates the failed circuit. For example, assume test data word 011 also mismatched the corresponding word in a fixed store while test data words, 9, 10 and 12 matched the fixed store words to which they correspond. It could then be concluded that driver DY4 had failed, since this circuit is the only one common to test data word locations 4 and 11.

In addition to writing predetermined test data words into the memories 12 and 14, the signal provided on line 29 by the compare means 24, will activate the failure analysis subsystem control means 34. As has already been discussed, the control means 34 initially, in what may be considered phase 1, causes the failure analysis subsystem to ascertain which of the two memories failed. On the basis of the results provided by phase 1, the subsystem can be caused to perform phase two in which a circuit failure analysis is performed in order to ascertain the particular failed circuit.

In the execution of phase one, the subsystem control means 34 will provide true output signals on conductors 74 and 76. Conductor 74 is connected to the input of OR gate 78, which in turn is connected to the set input terminal of flip-flop 80. The state of flip-flop 80 determines whether information shall be read from memory 12 or memory 14. More particularly, the true output terminal of flip-flop 80 is connected to the input of AND gate 82, whose output is connected to the read control terminal of memory 12. Thus, as will be seen hereinafter, when flip-flop 80 is true, memory 12 can be read. The false output terminal of flip-flop 80 is connected to the input of AND gate 84, whose output is connected to the read control terminal of memory 14. Therefore, when flip-flop 80 is false, memory 14 can be read.

Conductor 76, which is made true during phase one, is connected to the input of OR gate 86, whose output is connected to the input of AND gates 82 and 84. The output of pulse source 88 is also connected to the inputs of AND gates 82 and 84. Thus, when phase one is defined, by conductors 74 and 76 being made true, either memory 12 or memory 14, dependent upon the state of flip-flop 80, will be read at a rate determined by the pulse source 88.

The conductor 76 is additionally connected to an enable terminal of counter 90. The output of pulse source 88 is also connected to counter 90. Counter 90 is illustrated as having eight output terminals which are energized in sequence at a rate determined by the frequency of the output of pulse source 88. The counter 90 can, for example, be a cyclic counter capable of defining eight states during which the initial eight test data words are read and compared. The hardware configuration of the counter 90 may take many forms, but, in the preferred embodiment of the invention, it is contemplated that it be comprised of magnetic cores.

Each of the output terminals of counter 90 is connected to a different input terminal of an address generator 92. The function of the address generator 92 is to provide a different 12 bit address on its output terminals 93 in response to the energization of each of the output terminals of counter 90. Additionally, as it will be seen hereinafter, the address generator 92 will also provide 12 bit address codes in response to the energization of each output terminal of a counter 94, which is used to define states 9—16, during which test data words 9—16 are read and compared.

The address generator 92 can, for example comprise a prewired magnetic core matrix. Thus, the address generator can be comprised of a matrix of 16 columns and 12 rows of magnetic cores. Each of the 16 column conductors would be connected to a different output terminal of the sixteen output terminals of counters 90 and 94. Thus, for each different state defined by the counters 90 and 94, a different column conductor of the address generator would be energized. Each of the column conductors in the address generator matrix could be uniquely threaded through 12 cores in the corresponding columns so that a current along the column conductor generates a unique 12 bit address code on 12 row conductors, each coupled to the cores of a different row. The 12 row conductors constitute the generator output lines 93. The 12 bit address codes are supplied to the selection means of the memories 12 and 14.

From what has been said thus far, it should be appreciated that after the failure analysis mode is initiated, test data words are written into 16 preselected locations of the memories 12 and 14 by the write lines 70 and 72. Additionally, sequencing of the counter 90 is initiated. During the first cycle, or eight counts, of the counter 90, the first eight test data words stored in memory 12 will be accessed. Output terminal 8 of counter 90 is connected to the input of OR gate 96, whose output is connected to the reset input terminal of flip-flop 80. Thus, after one cycle of the counter 90, the flip-flop 80 is reset to thereby enable AND gate 84. Accordingly, during the next cycle, or eight counts of counter 90, the initial eight test data words from memory 14 will be read out.

As each successive state is defined by counter 90, a different address is applied to the selection means 62 of memories 12 and 14. This results in a test data word being read out of the memory defined by the state of flip-flop 80. The words read out of the memories appearing on either lines 20 or 22 are applied through OR gates 98 to a fixed compare-store 100.

Figure 6:
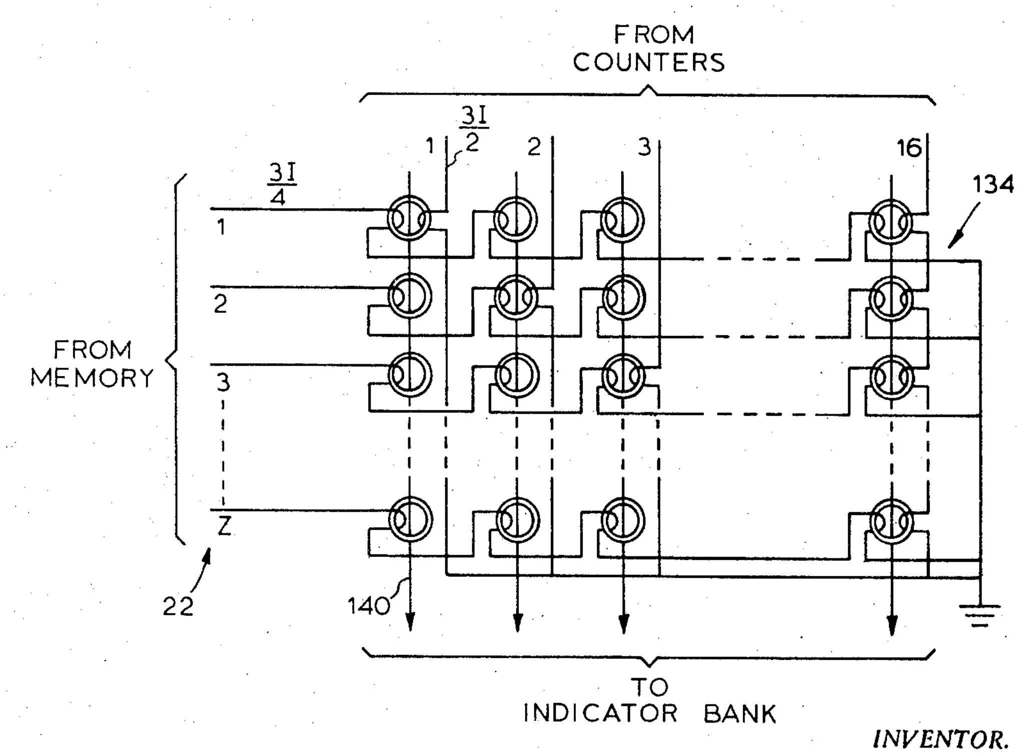
FIG. 6 is a schematic diagram of a fixed store utilized to compare read test data words with corresponding prewired words. DESCRIPTION OF THE PREFERRED EMBODIMENT Attention is now called to FIG. 1 of th the drawings, which illustrates a block diagram of a data processing system incorporating the present invention. More particularly, the data processing system of FIG. 1 is comprised of some kind of utilization means such as a substantially conventional central processor 10, which, in most conventional applications, operates in conjunction with a single conventional digital memory, such as a random access core memory. Normally, the central processor 10 operates in response to a sequence of programed instructions which cause information to be read from a memory, operated upon, and written back into the memory. The memory normally includes a plurality of drivers and switches which must operate flawlessly for the system to satisfactorily function. In order to assure high systems reliability, circuits and components are normally selected with great care, and, as a consequence, the "down time" in most modern systems has been significantly minimized. Despite the high reliability of most modern systems, certain critical data processing system applications require still greater reliability than has heretofore been achieved.

The compare store will be discussed in greater detail in conjunction with FIG. 6. If the test data word read from the memory matches the corresponding word in the fixed compare-store 100, it indicates that the drivers and switches associated with the location from which that test data word was accessed are good. If, however, the read test data word mismatches the corresponding word in the fixed compare-store, it indicates that at least one of the drivers or switches associated with that test data word has failed. The indications which represent the match and mismatch between the read test data words and the corresponding words stored in the fixed comparator 100, appear on the eight output terminals 101 of the store 100. The output terminals 101 are respectively coupled through first and second banks of AND gates 102 and 104 to first and second failure indicator banks 106 and 108.

More particularly, failure indicator bank 106 is comprised of eight failure indicators I1A—I8A all associated with memory 12. Similarly, bank 108 is comprised of indicators I1B—I8B. Assume that flip-flop 80 is true, meaning that AND gate 82 will be enabled and test data words will be read from memory 12. If, for example, driver DY4 of memory 12 had failed, the test data word read from memory 12 would be incorrect and would, therefore, not match the corresponding word stored in compare-store 100. This will result in a mismatch signal being provided on the fourth output terminal 101 of compare-store 100, which signal would be coupled through AND gate 102 to force indicator I4A to a mismatch state. Similarly, if any other circuit failures exist in either memory 12 or memory 14, the indicator in banks 106 and 108, corresponding thereto, will be in a mismatch state. Master indicators 110 and 112 are respectively responsive to the indicators of banks 106 and 108. Thus, if any of the indicators in bank 106 switch to a mismatch state, then the master indicator 110 will also switch to a mismatch state. Thus, at the end of two cycles of counter 90, eight test data words will have been read from each of the memories 12 and 14 and if a circuit failure had in fact occurred, either master indicator 110, 112, or both, would define a mismatch state. In any event, the outputs of the master indicator 110 and 112 are applied to the subsystem control means 34 to indicate thereto which of the two memories failed. On the basis of the memory failure information provided to the control means 34 by indicators 110 and 112, and other decision-making information otherwise provided thereto, the subsystem control means logic will cause any of several functions to be performed. For example, it could, via control line 114, cause a compare means 24 to thereafter disregard the output of the failed memory and to utilize only the output of the good memory in a substantially conventional mode. If the original failure indication had been caused by transient noise, and the master indicators 110 and 112 both indicated that the memories are good, the system should be caused to revert to the normal two memory mode. If both memories have failures, then the control means 34 should immediately initiate phase two in order to isolate the failed circuit or circuits to thus facilitate repair.

In phase two, the subsystem control means 34 will define a true state on output terminal 116 to thus enable counter 94, which will then be driven at the rate defined by the pulse source 88. Additionally, the control means 34 will provide a true level on either output terminal 117 or 119, to thus establish the state of flip-flop 80. Flip-flop 80 should, of course, be forced to a state corresponding to the failed memory, and with respect to which the circuit analysis is to be performed.

In response to terminal 116 becoming true, counter 94 will sequence, through counts 9 through 16, successively energizing each of its output terminals. As has previously been mentioned, as each output terminal of counter 94 is energized, a different 12 bit address code will be provided by address generator 92 to thus successively read test data words 9 through 16, which will, of course, be applied through OR gates 118 to compare-store 120. Compare-store 120 is provided with output terminals 121 which are connected to the inputs of first and second AND gate banks 122 and 124. When flip-flop 80 is true and memory 12 is being read, AND gate bank 122 is enabled so that mismatch signals appearing on the output line 122 of store 120 will be coupled to the indicators of failure indicator bank 126. On the other hand, when flip-flop 80 defines a false state, mismatch signals developed by the compare-store 120 will be coupled to the indicator bank 128. Indicator bank 126 is, of course, comprised of eight indicators respectively identified as I9A—I16A. The indicators of bank 128 are respectively identified as I9B—I16B.

It has been assumed, as an example, that if driver DY4 fails, it will be apparent that test data words 4 and 11 will mismatch the corresponding words stored in the compare-stores 100 and 120. Assuming the driver DY4 that failed is in memory 12, then indicator I4A in bank 106 and I11A in bank 126 will be said to be in a mismatch state.

Figure 5:
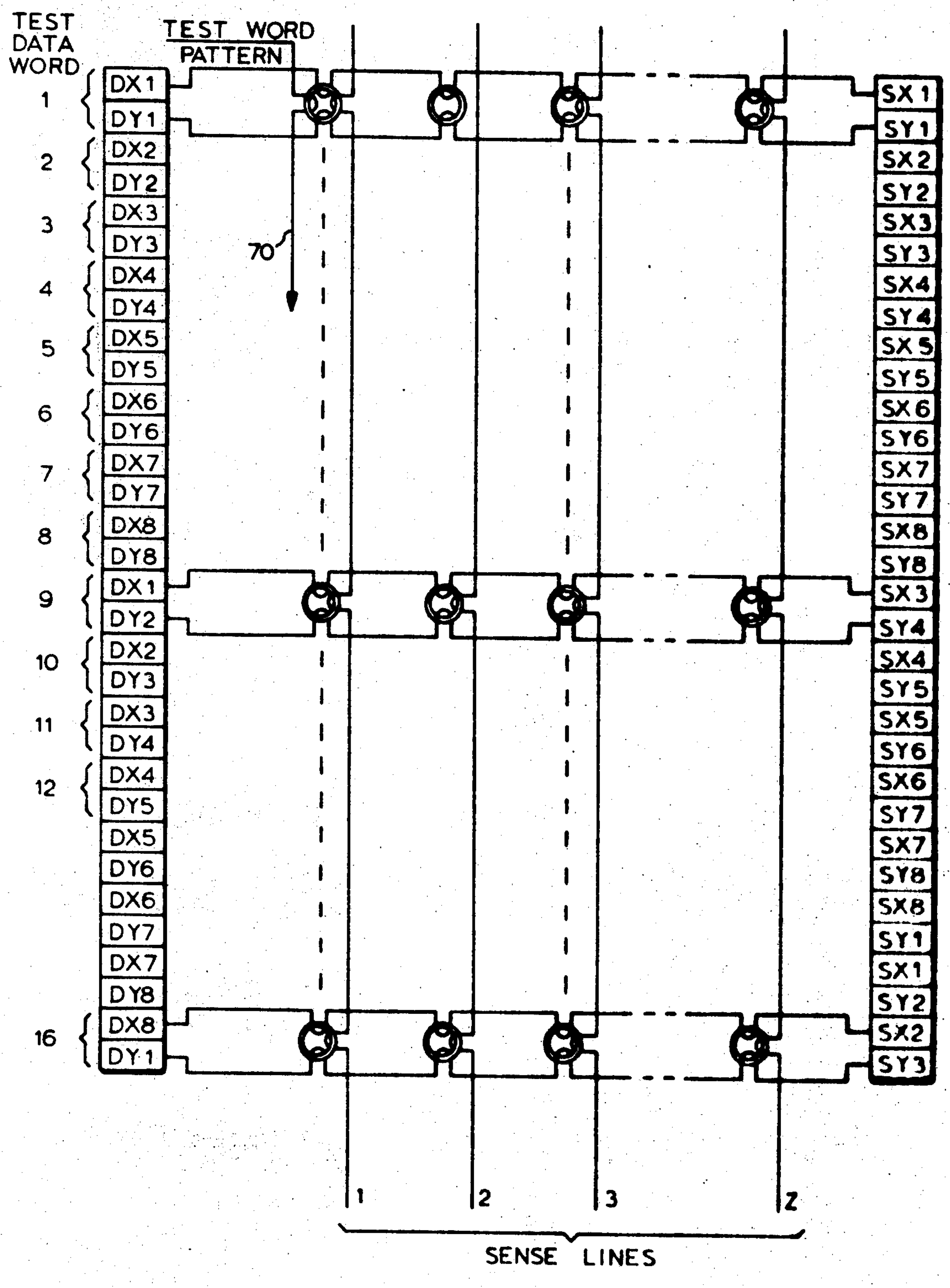
FIG. 5 is a block diagram illustrating a portion of a memory in accordance with the invention into which test data words are written for subsequent diagnostic purposes.

From the foregoing, the operation of the preferred embodiment of the system shown in FIG. 4 should be readily understood. However, in order to further clarify typical hardware which can be employed, attention is called to FIGS. 5 and 6. FIG. 5 indicates the 16 selected word locations in each memory into which the test data is written by special write lines 70 and 72, which thread the cores of the selected locations in order to write a certain pattern therein. In FIG. 5, it will be noted that a first word location is selected by the coincident energization of the row conductor connected between driver DX1 and switch SX1 and the column conductor connected between driver DY1 and switch SY1. The subsequent seven words illustrated in FIG. 4 are correspondingly connected between correspondingly positioned drivers and switches. For example, the eighth word illustrated in FIG. 5 is selected by the coincident energization of the row conductor connected between driver DX8 and switch SX8 and the column conductor connected between the driver DY8 and switch SY8. Thus, the connections shown in FIG. 5 correspond to those specified by Table I.

From what has been said thus far, it should be apparent that the word information read from the locations illustrated in FIG. 5 appear on the memory sense lines 20 or 22, shown in FIGS. 1 and 4. These sense lines are coupled to the fixed compare-stores 100 and 120 of FIG. 4. Although the compare-stores 100 and 120 are shown separately in FIG. 4, it is economical to form them in a single configuration 134, which can, for example, be of the core rope type shown in FIG. 6. As should be appreciated, the function of the fixed compare-stores is to compare information stored therein with the Z bits provided by the set of memory sense lines 20 or 22. The fixed compare-store, as shown in FIG. 6, is comprised of 16 columns and Z rows of memory elements. Each counter output terminal is threaded through the cores of a column to define a unique word which should correspond to a test data word read from memory during the corresponding counter state if the memory circuits associated with that word are good. Counters 90 and 94 provide current to each output terminal sufficient to switch all of the column cores coupled thereto in the fixed store 134 of FIG. 6. Thus, for example, if a current I is required along a column conductor in FIG. 6 to switch a core, the counter will provide a greater current (e.g., 3/2I) so that all of the cores in the corresponding column tend to switch. However, the conductors 22 from the memory provide currents having a magnitude (e.g., 3/4I) sufficient to inhibit such switching. Thus, if the test data word read from memory matches the corresponding word stored in the fixed store 134, none of the cores in the associated store column will switch. If, on the other hand, the read test data word mismatches the corresponding word in the fixed store 134 defined by the threading of a counter output terminal therethrough, then one of the cores in the corresponding column will switch, thus providing a pulse on the column sense line 140 coupled thereto.

The 16 column sense lines of the store 134 are each connected to the indicator banks 106, 108, 126, and 128. In the case of a failure of a circuit, e.g., driver DY4, in one of the memories, the corresponding indicators (i.e., I4A and I11A) in the indicator bank associated with that memory will thus be set.

From the foregoing, it should be appreciated that a preferred embodiment of a redundant memory system has been disclosed herein, including a failure analysis subsystem for responding to a failure by identifying both the failed memory and the particular failed circuit therein.

Although a particular embodiment of the invention has been described and illustrated, it is recognized that modifications and variations may readily occur to those skilled in the art, and, consequently, it is intended that the claims be interpreted to cover such modifications and equivalents.

I claim:

1. A data processing system having a failure analysis subsystem comprising:
- a first memory;
- a second memory identical to said first memory;
- means for identically addressing said first and second memories to respectively read information therefrom;
- means for comparing said information read from said first and second memories;
- a utilization means;
- means coupling said first and second memories to said utilization means for applying information read from said memories to said utilization means;
- means comparing the outputs of said first and second identical memories; and
- a failure analysis subsystem responsive to the means comparing the outputs of said memories for determining which memory has failed when the outputs from the identical memories mismatch including:
  - a third memory storing predetermined information;
  - means for writing predetermined test data into said first and second memories so that all of the drivers and switches of said memories are utilized upon subsequent readout of said memories;
  - means for causing said addressing means to read said test data from said first and second memories;
  - means for comparing said test data read from said first and second memories with said predetermined information stored in said third memory; and
  - means responsive to said means for comparing said test data read from said memories with said predetermined information for decoupling the memory having an output mismatching said predetermined information.

2. The system of claim 1 wherein each of said memories includes at least one matrix comprised of a plurality of memory elements, a plurality of X drivers, a plurality of X switches, a plurality of Y drivers, and a plurality of Y switches; and means uniquely coupling each element of each matrix to one of said X and Y drivers and X and Y switches of the same memory.

3. The system of claim 2 wherein said failure analysis subsystem includes: means in each of said memories for writing predetermined information into a group of selected memory elements thereof, each group including elements coupled to all of the X and Y drivers and X and Y switches of the same memory.

4. The system of claim 3 wherein said failure analysis subsystem further includes:
- a third memory storing predetermined information;
- means for causing said addressing means to read from groups of selected elements in said first and second memories; and
- means for comparing said information read from said groups of selected elements with said information stored in said third memory.

5. The system of claim 3 wherein said memory elements comprise magnetic cores; and wherein said writing means in each of said memories includes a write winding coupled to elements of said groups of selected elements.

6. The system of claim 4 including timing means; and address generator means responsive to said timing means for sequentially providing address signals identifying said selected elements to said addressing means.

7. The system of claim 6 including a device capable of defining first and second states; and means for causing said addressing means to read from said first memory in response to said device defining said first state and from said second memory in response to said device defining said second state.

8. A data processing system comprising:
- a first memory including a plurality of locations each capable of storing a data word;
- a second memory identical to said first memory including a plurality of locations each capable of storing a data word;
- means for substantially simultaneously reading from corresponding locations of said first and second memories;
- means for comparing data words read from said first and second memories;
- a utilization means; and
- means responsive to said comparing means indicating said data words read from said first and second memories match for coupling said matching read data word to said utilization means.

9. The system of claim 8 including a diagnostic subsystem; and means responsive to said comparing means indicating said data words read from said first and second memories mismatch for initiating operation of said diagnostic subsystem.

10. The system of claim 9 including means in said diagnostic subsystem for writing predetermined test data words into predetermined locations of said first and second memories:
- a third memory storing a plurality of test data words; and
- means for sequentially accessing said predetermined memory locations and for comparing the data words read therefrom with said data words stored in said third memory.

11. The system of claim 10 including a plurality of memory circuits in each of said memories, a unique combination of such circuits being associated with each location of that memory; and wherein each of said plurality of memory circuits is associated with at least one of said predetermined memory locations.

12. The system of claim 10 wherein said third memory comprises a magnetic core matrix comprised of rows and columns and wherein said means for comparing data words read from said predetermined locations with data words stored in said third memory includes:
- a plurality of column conductors, each associated with the cores of a different column and coupled to selected cores of that column for switching said selected cores to a first state;
- a plurality of row conductors, each associated with the cores of a different row and coupled to the cores thereof for switching them to a second state; and
- means for applying said test data words read from said predetermined locations to said plurality of row conductors.

PO-1050
(5/69)

UNITED STATES PATENT OFFICE
CERTIFICATE OF CORRECTION

Patent No. 3,544,777 Dated December 1, 1970

Inventor(s) Ted (nmi) Winkler

It is certified that error appears in the above-identified patent and that said Letters Patent are hereby corrected as shown below:

Column 3, line 59, change "stores" to --stored--;

Column 4, line 11, delete the second "D" before "DX8";

Column 9, line 30, delete "and".

SIGNED AND SEALED MAR 9 1971

(SEAL)
Attest:

Edward M. Fletcher, Jr.
Attesting Officer

WILLIAM E. SCHUYLER, JR.
Commissioner of Patents